UNITED STATES PATENT OFFICE.

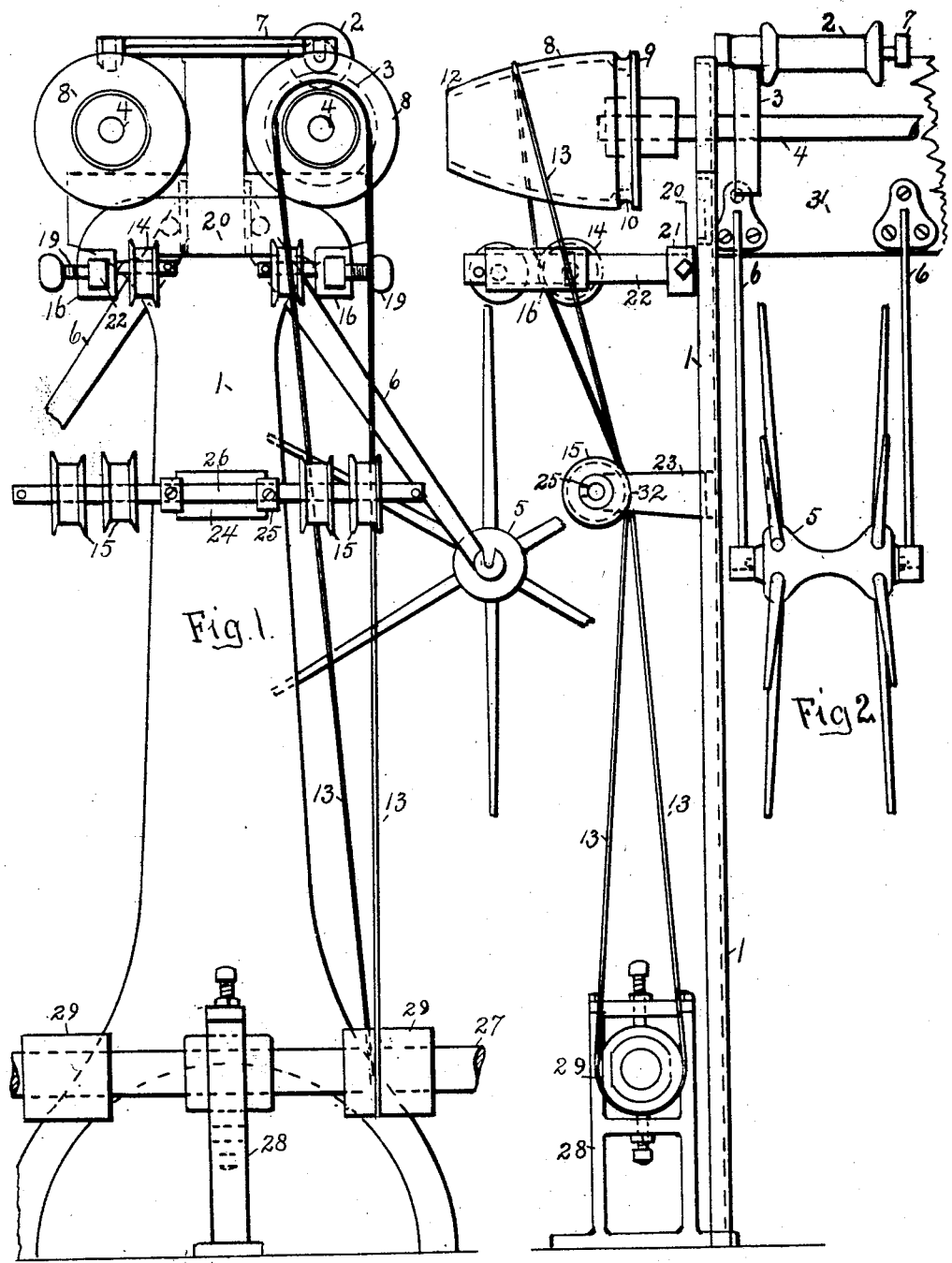

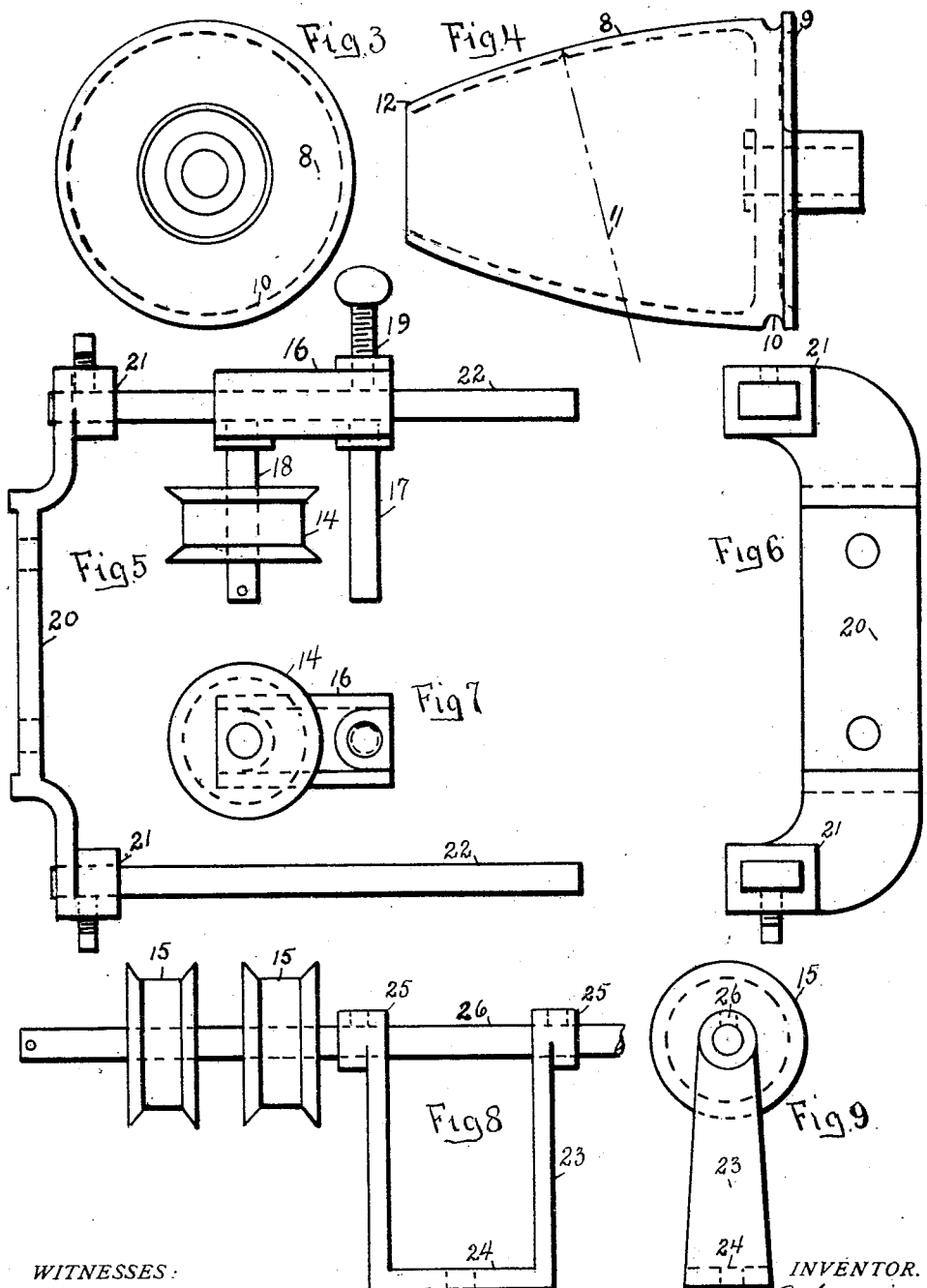

EUGENE P. SEARING, OF HAWTHORNE, NEW JERSEY.

BELT-DRIVE FOR TEXTILE-WINDERS.

1,376,465.  Specification of Letters Patent.  Patented May 3, 1921.

Application filed March 25, 1919. Serial No. 284,989.

*To all whom it may concern:*

Be it known that I, EUGENE P. SEARING, a citizen of the United States, and resident of Hawthorne, in the county of Passaic and State of New Jersey, have invented certain new and useful Improvements in Belt-Drives for Textile-Winders, of which the following is a specification.

This invention relates to a machine used in textile winding and has for its objects, the providing of a variable speed for winding different grades and kinds of thread, and a means for stopping the machine.

I attain these results by the mechanism as illustrated in the accompanying drawings.

In the drawings similar numerals refer to similar parts throughout the several views.

In the illustration:

Figure 1 represents the end view of a winding frame with the device attached.

Fig. 2 is a side elevation of Fig. 1.

Fig. 3 shows an end view of the driven pulley.

Fig. 4 is a side view of Fig. 3.
Fig. 5 is a plan of the bracket with one slide.

Fig. 6 is a detail of the bracket.

Fig. 7 is a top view of one of the slides.

Fig. 8 is an elevation of the belt guide which is secured to the frame.

Fig. 9 is an end view of Fig. 8.

In the ordinary winder in which there is a flat belt driving from above, the operator, who is generally a girl, has to push the belt over from one step to another with her hand to change the speed of the machine, and also has to push it off with her hand if it is necessary to stop the machine.

My invention obviates this hand work;
enables the operator to obtain any speed within certain limits, or to stop the machine without personal danger; and secures a surface belt contact equal to about 180 degrees of frictional area.
In the drawings, the frame 1, with the rail 31 on which are the spindle brackets 7, is constructed, the same as in the ordinary winder. The shaft 4, pulley 3, and spool 2 on the spindle, and the swift 5, are also the same as ordinary winders. Instead of driving from overhead, this invention is driven from below, by pulleys 29 on a shaft 27 or motor.

On the ends of the shafts 4, cones 8 are secured. This cone, or rather a frustum of a cone, is constructed hollow for lightness and the outside is turned on a radius 11 centering from a point 32 in the stand 23; so that when the belt 13 is on the end 12 of the cone, it will be the same length as when near the groove 10 on the end 9; that is, the belt 13 will have the same pulling power on whatever part of the cone it is.

The groove 10 in the end 9 of the cone, is so constructed that when it is desired to stop the machine the belt 13 is drawn over to the groove 10, and, dropping in, runs loose or slack around it and the machine stops.

On the frame 1 of the winder there is a stand 23 supporting a shaft 26 in the bearing 25 on which the small rolls or pulleys 15 turn freely and over which the belt 13 (a round belt is shown in this case) passes. These rolls or pulleys adjust themselves according to the position of the belt on the cone but the center of the arc 8 is about where the band touches the rolls 15.

The bracket 20 secured to the frame 1 near the cone holds the bars 22, on which the slides 16 can be moved, or secured.

The slides 16 have one or two pins 17 and 18 secured in them. On one or both, a flanged pulley 14, same as 15 revolves, over which the belt 13 also passes.

This slide has a thumb screw 19 by which it is secured in the desired position on the bar 22, said bar being supported at 21 to the stand 20. By moving this slide the belt is controlled at any point on the cone, or in the groove 10 to stop the machine. Thus it can be seen that the slide can be moved to any position and produce a variable speed drive, or stop the machine.

Having thus described my invention, what I claim and desire to secure by Letters Patent is:

1. In a textile winding machine a cone shaped pulley having a curved surface on a center of curvature about a central point outside the cone, a belt or band running from said central point around said cone shaped pulley retaining its uniform friction on the pulley in connection with a stand carrying rolls constituting the above mentioned central point and said rolls forming belt shifting means for the purpose of producing a variable speed, in connection with a groove at one end of the pulley for stopping purposes.

2. In a textile winding machine a cone shaped pulley having a curved surface on a center of curvature about a central point outside the cone, a belt or band running from said central point around said cone shaped pulley retaining its uniform friction on the pulley, a stand carrying rolls constituting the above mentioned central point and said rolls forming belt shifting means for the purpose of producing a variable speed, in connection with a groove at one end of the pulley for stopping purposes.

Signed at Paterson, in the county of Passaic and State of New Jersey this 21st day of March, A. D. 1919.

EUGENE P. SEARING.

Witnesses:
 BESSIE M. DOHERTY,
 ISAAC ANDERSON.